United States Patent
Borlet-Hote et al.

(10) Patent No.: US 10,680,826 B2
(45) Date of Patent: Jun. 9, 2020

(54) SECURE PRODUCT IDENTIFICATION AND VERIFICATION

(71) Applicant: INEXTO SA, Lausanne (CH)

(72) Inventors: Alain Laurent Robert Borlet-Hote, Lausanne (CH); Erwan Fradet, Grandvaux (CH); Yannick Georges Charles Gauthier, Lausanne (CH)

(73) Assignee: INEXTO SA, Lausanne (CH)

( * ) Notice: Subject to any disclaimer, the term of this patent is extended or adjusted under 35 U.S.C. 154(b) by 228 days.

(21) Appl. No.: 15/547,506

(22) PCT Filed: Jan. 29, 2016

(86) PCT No.: PCT/EP2016/052008
§ 371 (c)(1),
(2) Date: Jul. 30, 2017

(87) PCT Pub. No.: WO2016/120487
PCT Pub. Date: Aug. 4, 2016

(65) Prior Publication Data
US 2018/0034640 A1 Feb. 1, 2018

(30) Foreign Application Priority Data
Jan. 31, 2015 (EP) .................................... 15153386

(51) Int. Cl.
*H04L 9/32* (2006.01)
*G05B 19/418* (2006.01)
(Continued)

(52) U.S. Cl.
CPC ........ *H04L 9/3247* (2013.01); *G05B 19/4183* (2013.01); *G06F 21/10* (2013.01);
(Continued)

(58) Field of Classification Search
None
See application file for complete search history.

(56) References Cited

U.S. PATENT DOCUMENTS

| | | | |
|---|---|---|---|
| 4,035,615 | A | 7/1977 | Best et al. |
| 4,094,244 | A | 6/1978 | Edwards et al. |

(Continued)

FOREIGN PATENT DOCUMENTS

| | | |
|---|---|---|
| CN | 101354753 | 1/2009 |
| CN | 101609626 | 12/2009 |

(Continued)

OTHER PUBLICATIONS

Extended European Search Report in 15153386.6, dated Oct. 16, 2015, 7 pages.

(Continued)

*Primary Examiner* — Kaveh Abrishamkar (57) ABSTRACT

There is provided a method and system for authenticating a production of products. The method and system comprise determining if configuration data for the production run is authorized and, if the production run is authorized, generating a security token and associating the token with configuration data. The configuration data is digitally signed by generating a digital signature and associating the digital signature with the configuration data. The digital signature associated with the digitally signed configuration data is verified. Products are then produced in a production run according to the digitally signed configuration data, and the set of secure product identifiers is printed on the products according to the digitally signed configuration data.

15 Claims, 3 Drawing Sheets

(51) Int. Cl.
  *G06F 21/10* (2013.01)
  *H04L 9/14* (2006.01)
  *H04L 9/30* (2006.01)

(52) U.S. Cl.
  CPC ................ *H04L 9/14* (2013.01); *H04L 9/30* (2013.01); *Y02P 90/10* (2015.11)

(56) References Cited

U.S. PATENT DOCUMENTS

| | | | |
|---|---|---|---|
| 4,354,101 | A | 10/1982 | Hester et al. |
| 4,463,250 | A | 7/1984 | McNeight et al. |
| 4,529,871 | A | 7/1985 | Davidson |
| 4,860,226 | A | 8/1989 | Martin et al. |
| 4,963,719 | A | 10/1990 | Brooks et al. |
| 5,382,779 | A | 1/1995 | Gupta |
| 5,467,433 | A | 11/1995 | Lamprecht, Jr. et al. |
| 5,621,864 | A | 4/1997 | Benade et al. |
| 5,646,389 | A | 7/1997 | Bravman et al. |
| 5,767,498 | A | 6/1998 | Heske, III et al. |
| 5,805,779 | A | 9/1998 | Christopher et al. |
| 5,837,983 | A | 11/1998 | Actis et al. |
| 5,850,080 | A | 12/1998 | Herzig |
| 5,892,900 | A | 4/1999 | Ginter et al. |
| 5,930,215 | A | 7/1999 | Fite et al. |
| 5,974,150 | A | 10/1999 | Kaish et al. |
| 6,069,955 | A | 5/2000 | Coppersmith et al. |
| 6,122,403 | A | 9/2000 | Rhoads |
| 6,134,561 | A | 10/2000 | Brandien et al. |
| 6,212,638 | B1 | 4/2001 | Lee et al. |
| 6,217,966 | B1 | 4/2001 | Finster et al. |
| 6,226,619 | B1 | 5/2001 | Halperin et al. |
| 6,260,029 | B1 | 7/2001 | Critelli |
| 6,272,634 | B1 | 8/2001 | Tewfik et al. |
| 6,371,375 | B1 | 4/2002 | Ackley et al. |
| 6,442,276 | B1 | 8/2002 | Doljack |
| 6,456,729 | B1 | 9/2002 | Moore |
| 6,546,729 | B2 | 4/2003 | Hellat et al. |
| 6,547,137 | B1 | 4/2003 | Begelfer et al. |
| 6,712,275 | B1 | 3/2004 | Borg |
| 6,725,366 | B1 | 4/2004 | Swanberg |
| 6,832,202 | B1 | 12/2004 | Schuyler et al. |
| 6,892,947 | B1 | 5/2005 | Jam et al. |
| 6,963,846 | B1 | 11/2005 | Kelly et al. |
| 6,996,543 | B1 | 2/2006 | Coppersmith et al. |
| 7,028,901 | B2 | 4/2006 | Carlson |
| 7,188,258 | B1 | 3/2007 | Aggarwal et al. |
| 7,246,748 | B1 | 7/2007 | Feuerman et al. |
| 7,267,271 | B2 | 9/2007 | Rhea |
| 7,283,630 | B1 | 10/2007 | Doljack |
| 7,497,379 | B2 | 3/2009 | Chen et al. |
| 7,539,868 | B2 | 5/2009 | Balard et al. |
| 8,037,294 | B2 | 10/2011 | Nochta |
| 8,175,578 | B2 * | 5/2012 | McCown ............... H04L 63/107 380/247 |
| 2001/0047340 | A1 | 11/2001 | Snow et al. |
| 2002/0053796 | A1 | 5/2002 | McCann et al. |
| 2002/0091593 | A1 | 7/2002 | Fowler |
| 2002/0158133 | A1 | 10/2002 | Conzola et al. |
| 2002/0158137 | A1 | 10/2002 | Grey et al. |
| 2003/0042132 | A1 | 3/2003 | Cato |
| 2003/0051767 | A1 | 3/2003 | Coccaro et al. |
| 2003/0074223 | A1 | 4/2003 | Hickle et al. |
| 2003/0126034 | A1 | 7/2003 | Cheney et al. |
| 2004/0024790 | A1 | 2/2004 | Everett |
| 2004/0084530 | A1 | 5/2004 | McQueen et al. |
| 2004/0117265 | A1 | 6/2004 | Hoffman |
| 2004/0140362 | A1 | 7/2004 | Allen |
| 2004/0172260 | A1 | 9/2004 | Junger et al. |
| 2004/0212480 | A1 | 10/2004 | Carrender et al. |
| 2005/0006469 | A1 | 1/2005 | Nonneman et al. |
| 2005/0097054 | A1 | 5/2005 | Dillon |
| 2005/0108044 | A1 | 5/2005 | Koster |
| 2005/0127176 | A1 | 6/2005 | Dickinson et al. |
| 2005/0189255 | A1 | 9/2005 | Safian |
| 2005/0234823 | A1 | 10/2005 | Schimpf |
| 2005/0246237 | A1 | 11/2005 | Hudetz et al. |
| 2005/0273369 | A1 | 12/2005 | Ota et al. |
| 2005/0273434 | A1 | 12/2005 | Lubow |
| 2005/0288938 | A1 | 12/2005 | Date et al. |
| 2006/0011726 | A1 | 1/2006 | Chen et al. |
| 2006/0080190 | A1 | 4/2006 | Furukawa et al. |
| 2006/0091209 | A1 | 5/2006 | He |
| 2006/0143180 | A1 * | 6/2006 | Peterson ................. H03M 7/30 |
| 2006/0144940 | A1 | 7/2006 | Shannon et al. |
| 2007/0001006 | A1 | 1/2007 | Schuessler et al. |
| 2007/0024449 | A1 | 2/2007 | Bilyeu et al. |
| 2007/0051816 | A1 | 3/2007 | Chu |
| 2007/0170241 | A1 | 7/2007 | Grant |
| 2007/0203808 | A1 | 8/2007 | Sekimoto et al. |
| 2008/0046263 | A1 | 2/2008 | Sager et al. |
| 2008/0066167 | A1 | 3/2008 | Andri |
| 2009/0014537 | A1 | 1/2009 | Gelbman |
| 2009/0105866 | A1 | 4/2009 | Fontanot |
| 2009/0159666 | A1 | 6/2009 | O'Brien et al. |
| 2009/0230190 | A1 | 9/2009 | Chanez et al. |
| 2009/0323967 | A1 | 12/2009 | Peirce et al. |
| 2010/0258641 | A1 | 10/2010 | Yu |
| 2011/0154046 | A1 | 6/2011 | Fradet et al. |
| 2011/0265428 | A1 | 11/2011 | Schmitz |
| 2012/0102334 | A1 | 4/2012 | O'Loughlin et al. |
| 2012/0130868 | A1 | 5/2012 | Loken |
| 2012/0215918 | A1 | 8/2012 | Vasters et al. |
| 2012/0228388 | A1 | 9/2012 | Kuo et al. |
| 2012/0254052 | A1 | 10/2012 | Gao et al. |
| 2012/0284505 | A1 | 11/2012 | Smith et al. |
| 2012/0310848 | A1 | 12/2012 | Gao et al. |
| 2013/0004946 | A1 | 1/2013 | Chesnut et al. |
| 2013/0099901 | A1 | 4/2013 | Jones et al. |
| 2013/0169409 | A1 | 7/2013 | Chang et al. |
| 2013/0226326 | A1 * | 8/2013 | Yoshida ............... G05B 19/128 700/103 |
| 2013/0283156 | A1 | 10/2013 | Al Badrashiny et al. |
| 2013/0297929 | A1 | 11/2013 | Chaves et al. |
| 2014/0025594 | A1 | 1/2014 | Schmitz |
| 2014/0046852 | A1 | 2/2014 | Chatelain et al. |
| 2014/0122479 | A1 | 5/2014 | Panferov et al. |
| 2014/0173685 | A1 | 6/2014 | Bittles et al. |
| 2014/0173688 | A1 | 6/2014 | Fischer |
| 2014/0189362 | A1 | 7/2014 | Van Den Broeck et al. |
| 2014/0351601 | A1 | 11/2014 | Jozwiak |
| 2014/0367464 | A1 | 12/2014 | Herzig |
| 2015/0269559 | A1 | 9/2015 | Inotay et al. |
| 2015/0310386 | A1 | 10/2015 | Fradet et al. |
| 2015/0317644 | A1 | 11/2015 | Chanez et al. |
| 2015/0332210 | A1 | 11/2015 | Niquille et al. |
| 2016/0027021 | A1 | 1/2016 | Kerdemelidis |
| 2016/0072626 | A1 | 3/2016 | Kouladjie |
| 2016/0299685 | A1 | 10/2016 | Zhai et al. |
| 2016/0307153 | A1 | 10/2016 | Loken et al. |
| 2017/0109549 | A1 | 4/2017 | Fradet et al. |
| 2018/0131520 | A1 * | 5/2018 | Brockhaus ............. G06F 21/57 |

FOREIGN PATENT DOCUMENTS

| | | |
|---|---|---|
| CN | 102542215 | 7/2012 |
| EP | 1 645 992 A | 4/2006 |
| EP | 2172882 | 4/2010 |
| GB | 2342743 | 4/2000 |
| JP | H-05151381 A | 6/1993 |
| JP | H07-156459 A | 6/1995 |
| JP | H08-69247 A | 3/1996 |
| JP | A-2001-328711 | 11/2001 |
| JP | 2003-104562 A | 4/2003 |
| JP | 2003208234 | 7/2003 |
| JP | A-2002-7970 | 7/2003 |
| JP | 2003233794 | 8/2003 |
| JP | 2004320715 A | 11/2004 |
| JP | 2005-060080 A | 3/2005 |
| JP | 2005/115890 | 4/2005 |
| JP | A-2005-200187 | 7/2005 |
| JP | A-2005-263472 | 9/2005 |
| JP | 2005-316940 A | 11/2005 |
| JP | 2006229582 | 8/2006 |
| JP | 2007-018355 A | 1/2007 |

(56) References Cited

FOREIGN PATENT DOCUMENTS

| | | |
|---|---|---|
| JP | 2007-528830 A | 10/2007 |
| JP | 2 900 486 A | 11/2007 |
| JP | 2008-515741 A | 5/2008 |
| JP | 2009-151668 | 7/2009 |
| JP | 2104067 | 9/2009 |
| KR | 100911762 B1 | 8/2009 |
| RU | 2199781 C1 | 2/2003 |
| RU | 2216776 C2 | 11/2003 |
| RU | 2225641 C2 | 3/2004 |
| WO | WO-02/073551 A1 | 9/2002 |
| WO | WO-2005/083644 A | 9/2005 |
| WO | WO-20016/038114 A | 4/2006 |
| WO | WO-2010/063909 | 6/2010 |
| WO | WO-2014/122479 | 8/2014 |

OTHER PUBLICATIONS

PCT Written Opinion of the International Searching Authority in PCT/EP2016/052008, dated Jan. 31, 2015, 10 pages.
"Best Compression algorithm for a sequence of integers", Nov. 12, 2008, Stack Overflow. (XP-002697996).
"Databases—No longer fit for purpose for Serialisation and Track & Trace", 2012.
Extended European Search Report in 15152959.1, dated Jul. 10, 2015, 4 pages.
PCT Written Opinion of the International Searching Authority in PCT/EP2016/051853, dated Apr. 11, 2016, 11 pages.
PCT International Search Report in PCT/EP2016/072453, dated Dec. 5, 2016.
PCT International Search Report in PCT/EP2016/069316, dated Oct. 26, 2016.
PCT International Search Report in PCT/EP2016/070138, dated Dec. 7, 2016.
PCT International Search Report in PCT/EP2016/070137, dated Nov. 14, 2016.
In Japanese Patent Application No. 2017-540271, Notice of Reasons for Refusal, dated Nov. 28, 2019, 4pgs.
Dodge et al., Codes of Life: Identification Codes and the Machine-Readable World, Dec. 2005, Environment and Planning D: Society and Space, vol. 23, pp. 851-881 (Year: 2005).
China National Intellectual Property Administration Search Report for Application No. 201580033643.9, 2 pages, dated Jul. 25, 2019.
Modi et al., "Securing the Manufacturing Environment using Biometrics", Oct. 2005, Proceedings 39th Annual 2005 International Carnahan Conference on Security Technology, pp. 275-278 (Year: 2005).

\* cited by examiner

Fig. 1
Code Initialization

Fig. 2
Code Generation

Fig. 3
Code Authentication

SECURE PRODUCT IDENTIFICATION AND VERIFICATION

CROSS-REFERENCE TO RELATED APPLICATIONS

This application is a U.S. National Stage Application under 35 U.S.C. 371 of International Application No. PCT/EP2016/052008, filed Jan. 29, 2016, which claims the benefit of and priority to European Patent Application No. 15153386.6, filed Jan. 31, 2015, the contents of all of which are herein incorporated by reference in their entireties.

FIELD OF THE INVENTION

The present invention relates generally to techniques for marking products with secure identification codes and verifying of those codes, and more particularly to systems and methods for managing the distribution of secure production configuration instructions and generating secure product identifiers.

BACKGROUND OF THE INVENTION

Existing methods for product identification typically involve the application of a unique identifier to a product at the time of packaging. These systems do not scale efficiently in organizations having multiple production facilities, or in production lines capable of packaging at a very high rate. Additionally, existing identifier methods are not sufficiently secure because they are not associated with secure production configuration instructions and do not carry additional product information beneficial to regulatory authorities and merchants.

There exists a need for an improved method and apparatus for securely controlling and authorizing the production of manufactured items, as well as marking manufactured items with secure product identifiers, particularly one which can be used for tax verification, production volume verification and authentication of manufactured items.

BRIEF SUMMARY OF THE INVENTION

In one aspect of the disclosure, there is provided a method for authenticating a production of products, the method including electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. Various computations that are described below, such as those within the code initialization, generation, and authentication procedures, need not be performed in the order disclosed, and other embodiments using alternative orderings of the computations could be readily implemented. In addition to being reordered, the computations could also be decomposed into sub-computations with the same results.

As used herein, an entity may refer to: i) a person, such as a consumer of a product; ii) a group, such as a group having a common interest, such as retailers; iii) a computing device; iv) a computing node in a networked system; v) a storage location, such as a memory storage unit storing a document; vi) a virtual point in a network, such as representing a business function within a business enterprise, and the like. Additionally, an entity may represent a point in a workflow, such as for authorization, which may be performed by a person responsible for that aspect of the workflow or a computing device which provides automated processing. The term entity is not meant to be limited to any one of these examples and may extend to other situations consistent with the concepts described herein.

BRIEF DESCRIPTION OF THE DRAWINGS

Embodiments of the invention will now be described, by way of example only, with reference to the accompanying drawings, in which.

DETAILED DESCRIPTION OF THE INVENTION

System Modules

Various modules are described below. Any of the modules can be co-located physically, or located remotely from each other. Additionally, any of the modules could be logically or physically combined into a single module without departing from the scope of the invention.

Control Module

Figure 1:
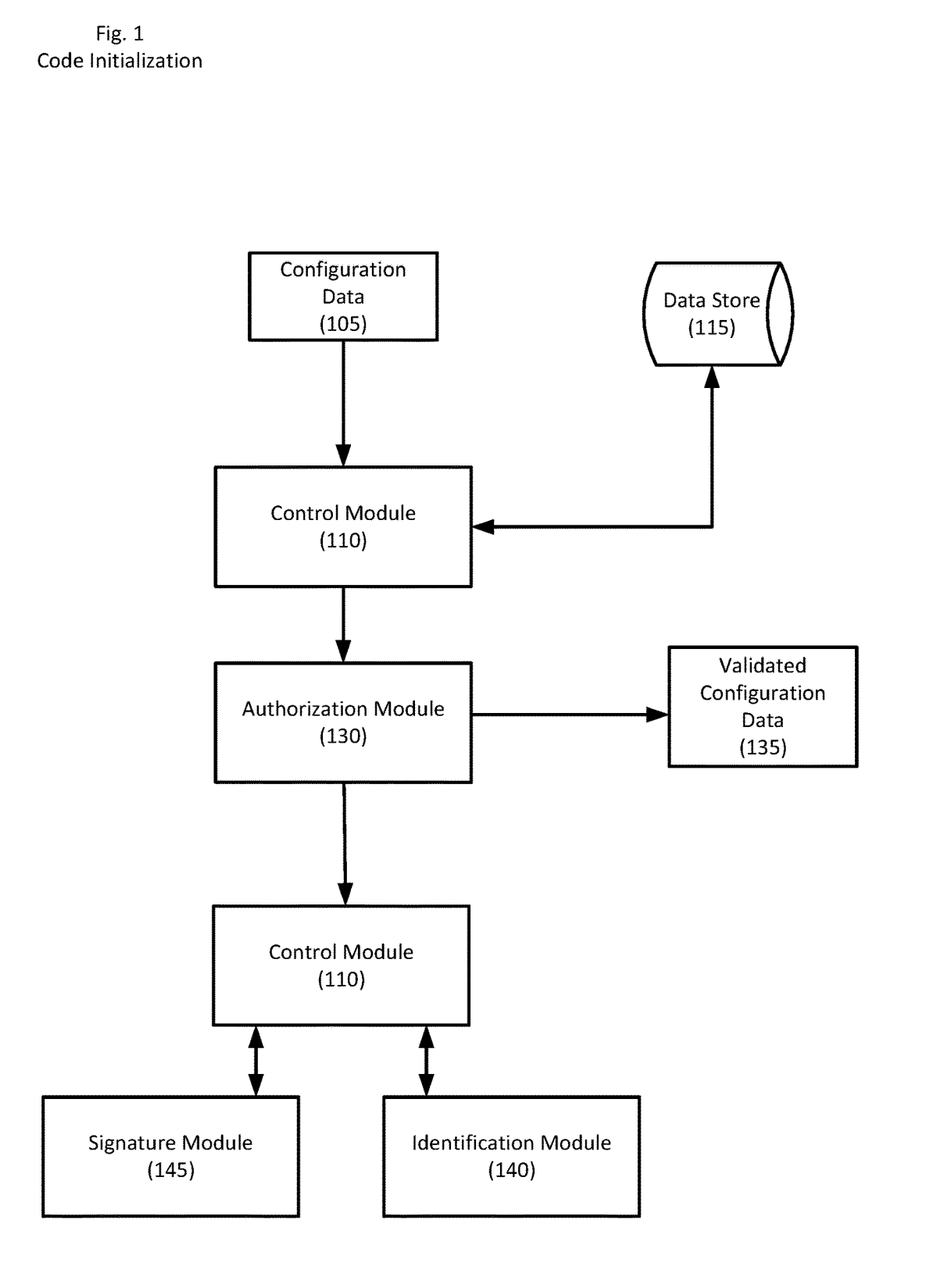
FIG. 1 illustrates an example method for code initialization.

With reference to FIG. 1, the Control Module (also known as the "Orchestrator") (110) can receive input from any of the other modules or outside sources and can provide instructions to the other modules in the system based on pre-configured programs and/or the operator inputs to it. It can also generate a dashboard summary of the system status.

Input to the Control Module can include any or all configuration data (105). The supplied configuration data can indicate any or all of the parameters including, but not limited to, machine for production, production line, factory, product to be produced, and volume of product. The configuration data may indicate what items (for example, products) are to be marked with the secure identifiers and how those items may be produced. The configuration data may indicate a range of products, such as starting and ending product identifiers. In some embodiments, the range can be a set of product identifiers. The configuration data may be provided by an operator of the system or be dynamically or automatically generated. The configuration data can include further executable instructions or an interpretable algorithm. The configuration data may be based on operator input or the output of a manufacturing execution system, or other centralized system for instructing how and what to produce.

The Control Module (110) can transmit the configuration data to any module, including but not limited to the Authorization Module (130), the Identification Module (140), and the Signature Module (145).

The Control Module can request authorization from the Authorization Module to execute a production operation. This process involves transmitting a request (including some or all of the configuration data) to the Authorization Module and receiving signed or encrypted configuration data. In some embodiments, the Authorization Module can return the configuration data to the Control Module, including a digital signature applied to that configuration data. The Authorization Module determines whether to authorize the request from the Control Module based on the data it receives. In addition, the information returned by the Authorization Module included in the Configuration data can be used to bound the codes generated with the authorization provided. As the data is signed by the Authorization Module, the system can be prevented from modifying the configuration data. As a non-limiting example, a modification of a request to produce one brand on in place of another may be controlled, allowed, or denied.

Authorizations received from the Authorization Module can also be transmitted to the Verification Module so that verification requests can be subsequently processed against those authorizations. The data transmitted to the Verification Module can include a secure identifier, as well as any of the configuration data. In some examples, the configuration data sent to the Authorization Module can include product range information.

The signed or validated configuration data can be the some or all of the set of input parameters of the Control Module, verified and validated by the Authorization Module, which remains in force during a production. A security token can be an output from the Authorization Module and/or an input parameter of the Control Module. The security token can be a proof that the product identifier corresponds to validated configuration data and therefore to an authorized production. The security token can be an input to the Signature Module to generate a signature for a single product identifier, or the signature of a single product identifier, or a product identifier itself, or a range of products or product identifiers. The security token can be a unique code, a random code, or a pseudo-random code. The security token can be any numerical, or alphabetic, or combination of numeric and alphabetic characters.

Authorization Module

The Authorization Module operates to validate requests for authorization to take an action in the identification system. In some embodiments, it can operate as a license manager.

The Authorization Module can receive the configuration data. The Authorization Module can also receive range and/or algorithm information. In some embodiments, the Authorization Module can receive input configuration data from the Control Module. The output range can optionally identify a range of products, machines, factories, ranges, or product volumes that are authorized. The output can also include range information and/or include an algorithm which comprises a set of executable or interpretable instructions that will be used to generate the security token. The Authorization Module can be centralized at the factory level or be decentralized on each production line, or a combination of both.

The Authorization Module can store and/or generate one or more encryption keys. In some embodiments, the key stored by the Authorization Module can be a private public encryption key according to a public key infrastructure (PM). In some embodiments, the Authorization Module stores the only copy of the private key. In other embodiments, the Authorization Module is distributed across several instances which replicate the keys between them. In the case of PM, the Authorization Module can output signed configuration data. In some embodiments, the Authorization Module can encrypt the configuration data and/or sign the configuration data output.

In some embodiments, the system is configured so that only the Authorization Module can read the secured input parameters of the Control Module, required for the generation of the security token. In some embodiments, the key is provided to the Authorization Module from another source.

The Authorization Module can be embodied as a hardware security module (HSM), or another type of physical computing device that safeguards and manages digital keys for strong authentication and providing cryptoprocessing. The Authorization Module functionality can be performed by a computer with an embedded board with an encryption key or PKI private key. The module can be equipped with features such that attempts to access the data will result in it being rendered unreadable or inaccessible.

If the input to the Authorization Module is a range and an algorithm, the Authorization Module can output an identity in the range of authorization and a security token of the identifier. For example, the output identity can be a range from 0 to 1,000 with a security token for each item in the range.

The Authorization Module can generate a key from any parameter used in the Control Module. In some embodiments, the Authorization Module may generate or derive a key from an existing key from any parameter used in the Control Module such that only a specific Authorization Module can use this key. The equipment and software implementing this public key technique can be embodied in an asymmetric cryptosystem.

The output of the Authorization Module can be information, such as the configuration data and, optionally, one or more security tokens, with a digital signature provided by the Signature Module. Alternatively, the output of the Authorization Module can be the configuration data encrypted to a key held by the Authorization Module. The output of the Authorization Module can be provided to the Control Module.

According to one embodiment, the method for authenticating a production of products includes electronically storing configuration data for a production run, wherein the configuration data for the production run specifies parameters used in the production of products; determining if the configuration data for the production run is authorized; if the production run is authorized: generating a security token and associating the token with the configuration data; and digitally signing the configuration data by generating a digital signature and associating the digital signature with the configuration data; receiving the digitally signed configuration data and the digital signature at a production machine; at the production machine, verifying the digital signature associated with the digitally signed configuration data; calculating a set of secure product identifiers based on the digitally signed configuration data; producing products in a production run according to the digitally signed configuration data; and printing the set of secure product identifiers on the products according to the digitally signed configuration data.

In further embodiments, the configuration data represents a range of products to be produced. In further embodiments the configuration data represents a range of products, machines, factories, ranges, or product volumes that are authorized. Further embodiments include receiving a verification request, the request comprising a product identifier and determining if the configuration data for the production run is authorized by reference to a license manager. Further embodiments include generating a security token for a range of products; and associating the security token with the range of products.

Signature Module

The Signature Module can receive the configuration data, an authorization key, a security token or any combination of them, as well as a unique product identifier generated by the Identification Module. In some embodiments, the Signature Module may receive, in addition, one or more intrinsic machine and/or product characteristics, and/or product item characteristics. The Signature Module can create a digital signature based on any or all of those inputs, generally referred to herein as configuration data.

To generate the digital signature, in some embodiments, the Signature Module can first generate a digest or other representation of the configuration data. In some embodiments, the digest can be generated by calculating a cryptographic hash value of the configuration data according to a digital signature algorithm provided by the Signature Module executing the digital signature algorithm. As non-limiting examples, the hash may be calculated according to MD5, SHA-1, SHA-2, SHA-3/Keccak functions. The digest can then be encrypted using a private key obtained by the Signature Module to generate the digital signature.

In some embodiments, a digital signature may use a Public Key Infrastructure (PM) technology to establish authenticity of configuration data. PM systems use certificates and keys to identify entities, individuals, or organizations. The Authentication Module uses a private key to sign the configuration data and associates the configuration data with a certificate including the public key used by the Authentication Module.

A recipient module uses a public key to verify the digital signature and, thereby, the authenticity of the signed configuration data. Supporting technologies can be employed to establish other non-repudiation features, such as the time of signing and the status of the signing keys. The public key may be provided to the recipient entity directly, or by publication in an on-line repository or directory.

Identification Module

The Identification Module can receive the configuration data and generate identifiers for items to be marked. The Identification Module can receive a digital signature generated by the Signature Module that will be combined with the unique identifier to generate a compound unique identifier.

The identifiers can include, or be based on, the date and/or time of production of a product to be marked and the digital signature received from the Signature Module. In some embodiments, the secure identifiers generated can be unique or substantially unique. In some embodiments, the secure identifiers can be the security token.

In the case of ranges, the Identification Module can generate a range identifier and a set of identifiers within the generated range.

The identifiers created may be output to a print control module for direct printing on to a product or may be input to further processing to generate another code that is printed on product packaging.

Verification Module

Figure 3:
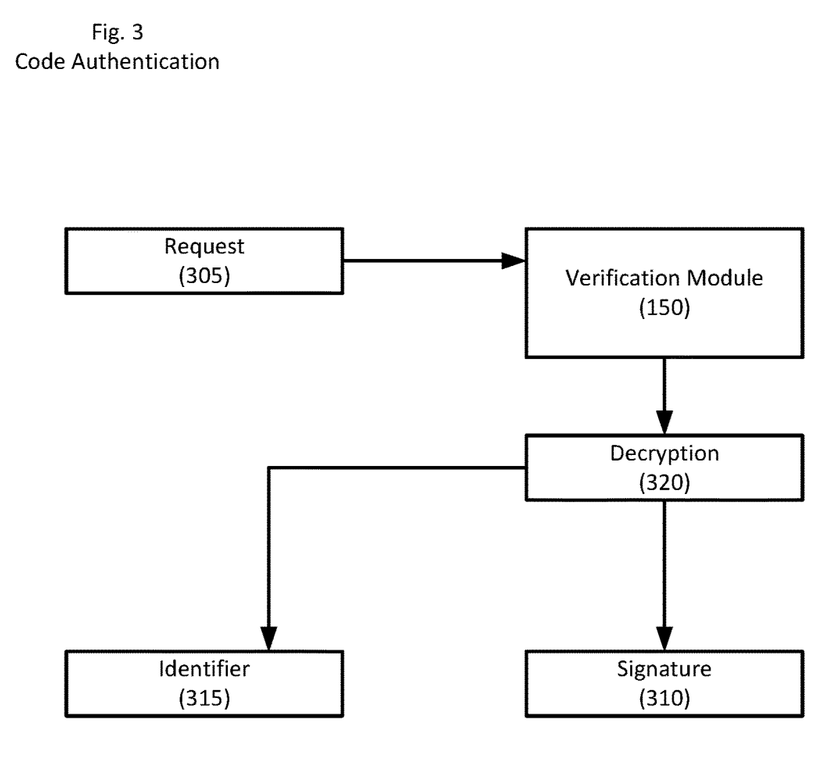
FIG. 3 illustrates an example method for code authorization.

With reference to FIG. 3, the Verification Module (150) can receive the verified configuration data and, based on that validated configuration data, validate a request for authorization (305) for a factory, machine, product, or production volume reported. The inputs to the Verification Module can include any or all of the verified configuration data, output from the signature module, identifiers, security tokens, and/or range information. The Verification Module can generate information for an Authorization Module with these parameters in order to verify/validate a product identifier.

The Verification Module can generate a decryption (320) of the request, which includes one or more identifiers or ranges of identifiers (315) and signature data (310) including one or more security tokens.

If a security token is input to the Verification Module, the Verification Module can return information relating to the authorization, the configuration data, and/or ranges. If a single security token is used for a range of products, the security token can be provided to the Verification Module to verify parameters associated with the range of products, rather than individual products. This embodiment may be particularly useful in the context of export regulation.

System Processes

Identification Code Initialization

Identification Code Initialization can be performed to validate the authorization and the parameters. In some embodiments, for performance reasons, this can be performed once at the beginning of the production. With reference to FIG. 1, the Control Module (110) can access a data store (115) for additional parameters, or additional parameters can be provided to the module. The parameters and the configuration data, once signed by the Authorization Module (130), form the validated configuration data (135). The Control Module receives verified configuration data as described above, in response to its request to the Authorization Module (130).

The authorization can be an authorization to produce a product, or to mark a product with a certain ID, or both. The configuration data and the additional parameters are transmitted to the Authorization Module and are used by the Authorization Module to generate the security token. The Authorization Module can sign the configuration data and the additional parameters, forming the signed configuration data. As discussed above, the configuration data can specify a certain production run or other products and activities. The Authorization Module can generate an authorization block including a key, authorized identifiers, and security token. In some embodiments, they key may be generated by the Authorization Module, or may be provided to it. The Authorization Module can transmit the authorization block to the Control Module. The Control Module can transmit the validated configuration data and other information, such as a list of identifiers, a range of identifiers, and/or one or more security tokens, to the Signature Module (145). The Signature Module can sign the data and send the signed data and the signature to the Control Module. The Identification Module (140) can then receive from the Control Module an initialization block including the identifiers and/or ranges of identifiers for products.

One embodiment of the invention includes a method for initializing a process for securely controlling a production facility, comprising: electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; and at the signature module, signing the validated configuration data.

Further embodiments can include determining if the configuration data for the production run is authorized; if the production run is authorized: generating a security token and associating the token with the configuration data; and digitally signing the configuration data by generating a digital signature and associating the digital signature with the configuration data.

Further embodiments can include receiving the digitally signed configuration data and the digital signature at a production machine; at the production machine, verifying the digital signature associated with the digitally signed configuration data; and calculating a set of secure product identifiers based on the digitally signed configuration data.

Further embodiments can include producing products in a production run according to the digitally signed configuration data; and printing the set of secure product identifiers on the products according to the digitally signed configuration data.

Further embodiments can include determining whether the production run is authorized further comprises retrieving licensing data from a licensing server.

Identification Code Generation

Figure 2:
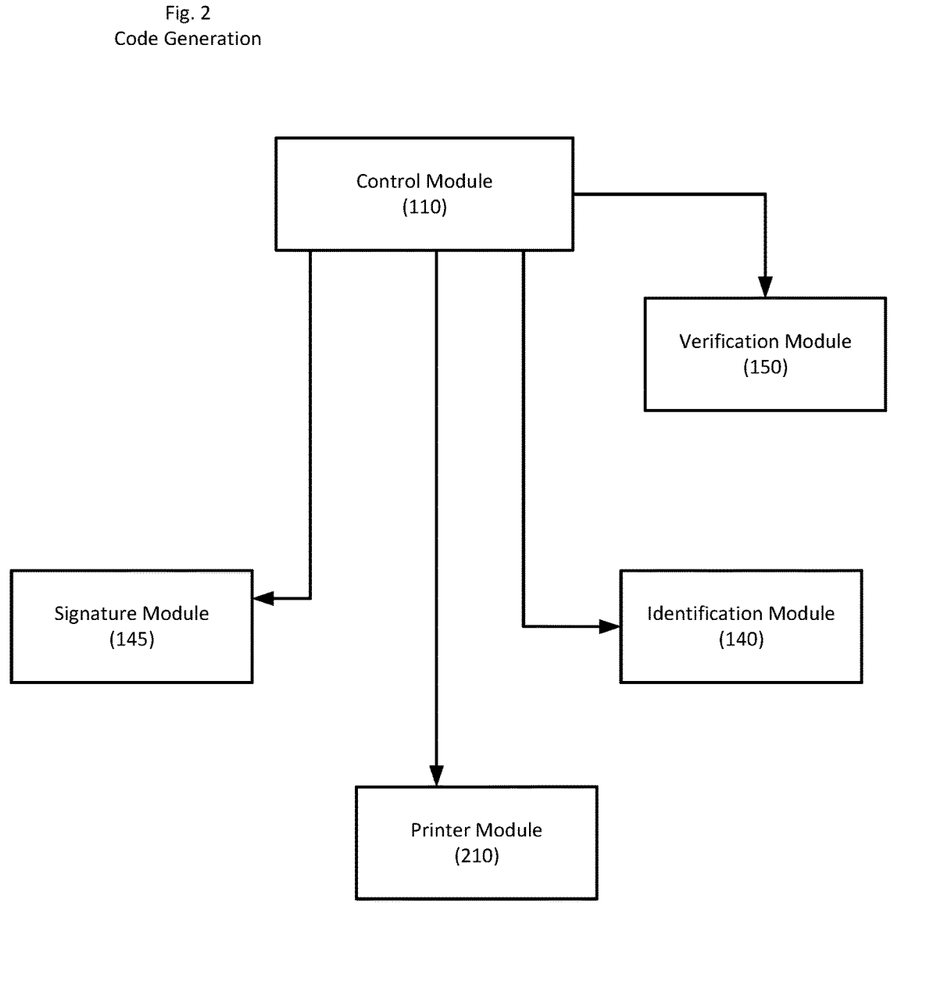
FIG. 2 illustrates an example method for code generation.

With reference to FIG. 2, the Code Generation process generates the codes during the production process. The identification code generation process can begin with a request to the Identification Module (140) for an identifier or a range of identifiers, which are then returned to the Control Module (110). The identifiers are then sent to the Signature Module (145), which signs the identifiers and returns the signed identifiers to the Control Module. The Signature Module can receive a security token. In some embodiments, the Signature Module does not need to be controlled by external instructions and if any identification code is to be counted, the code can be linked to a single security token. The Signature Module can be controlled by the Authorization Module. The Control Module can then send the output data to print control in Printer Module (210). The output data sent to the print control may be encrypted before transmission. The configuration data, can be transmitted to the Verification Module (150) for the handling of subsequent verification requests.

One embodiment of the invention includes a method for generating a code for securely identifying products produced at a production facility, including electronically receiving configuration data from an electronic data store; electronically storing the configuration data for a production run, wherein the configuration data for the production run specifies parameters used in the production of products; transmitting the configuration data to an authorization module; at the authorization module: determining whether the production run is authorized; generating validated configuration data comprising a key, a representation of a plurality of authorized product identifiers, and a security token; transmitting the validated configuration data to a signature module; at the signature module, signing the validated configuration data; at an identification module, receiving a request for a product identifier and generating a product identifier in response to the request; transmitting the product identifier from the identification module to a signature module; digitally signing the product identifier at the signature module; and transmitting the digitally signed product identifier to a printer module.

Further embodiments can include electronically receiving configuration data from an electronic data store; electronically storing the configuration data for a production run, wherein the configuration data for the production run specifies parameters used in the production of products; transmitting the configuration data to an authorization module; at an authorization module: determining whether the production run is authorized; generating validated configuration data comprising a key, a representation of a plurality of authorized product identifiers, and a security token; transmitting the validated configuration data to a signature module; at the signature module, signing the validated configuration data.

In further embodiments the request is for a range of identifiers. Further embodiments can include determining if the configuration data for the production run is authorized; if the production run is authorized: generating a security token and associating the token with the configuration data; and digitally signing the configuration data by generating a digital signature and associating the digital signature with the configuration data.

Verification of Identification Code

The Verification Module can receive a request for verification. The request can include one or more identification codes. The verification module can decrypt or otherwise deobfuscate the identifier code received. The resulting information, having been decrypted, can include a signature component and an identifier. The resulting identifier can be then be linked against the original configuration data previously stored in association with the identifier. The linked data can include other identifiers in a range, a security token, and other information stored in connection with the production of the product bearing that identification code.

Some embodiments can include additional functionality for processing identifiers that are provided to the Verification Module based on the party requesting the verification of the code. Different parties can be provided with different means to access the Verification Module. For example, a retailer or other form of merchant, may be provided with a different portal or communication channel than a consumer. The retailer may also be required to authenticate itself to the Verification Module.

In some embodiments, the system can be configured so that a verification by a consumer results in an identifier being marked as having been verified. The system can be further configured to store those codes for which verification is requested by a consumer. Any subsequent requests for verification of those already-verified codes can be denied or otherwise processed differentially.

Export Functions

Embodiments of the invention can be applied in the context of code export to third-parties. Those embodiments can include an export function configured to generate a separate code for this purpose. The exported code can be generated by collecting one or more product identifiers and/or security tokens, and signing those identifiers and/or tokens. The identifiers and/or tokens can be collected at any point in the production process. The signed identifiers and/or tokens in the form of exported codes can be provided to a third party who can store them and perform verification of the validity of the identifiers and/or tokens.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash", JAVA", C++, C, C #, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows', Apple™ Mac™, iOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A method for initializing a process for securely controlling a production facility, comprising:
electronically receiving configuration data from an electronic data store;
electronically storing the configuration data for a production run, wherein the configuration data for the production run specifies parameters used in the production of products, the specified parameters including at least one parameter selected from one or more of: a range of product identifiers having a starting value and an ending value, a machine for production, a production line, a factory, a product to be produced, and a volume of product to be produced;

transmitting the configuration data to an authorization module;

at the authorization module:
   determining whether the production run according to the specified parameters in the configuration data is authorized;
   generating validated configuration data comprising a key, a representation of a plurality of authorized product identifiers, and a security token;
   transmitting the validated configuration data to a signature module; and at the signature module, signing the validated configuration data;

based on the signed validated configuration data, generating and physically applying a secure product identifier or a code generated with the secure product identifier, on at least one of the products in the production, the products in the production having been produced according to the signed validated configuration data.

2. The method of claim 1, further comprising:
determining if the configuration data for the production run is authorized;
if the production run is authorized:
   generating the security token and associating the token with the configuration data; and
   digitally signing the configuration data by generating a digital signature and associating the digital signature with the configuration data.

3. The method of claim 1, further comprising:
receiving the digitally signed configuration data and the digital signature at a production machine;
at the production machine, verifying the digital signature associated with the digitally signed configuration data; and
calculating a set of the secure product identifiers based on the digitally signed configuration data.

4. The method of claim 1, further comprising:
producing products in a production run according to the digitally signed configuration data.

5. The method of claim 1, wherein determining whether the production run is authorized further comprises retrieving licensing data from a licensing server.

6. A method for generating a code for securely identifying products produced at a production facility, comprising:
electronically receiving configuration data from an electronic data store;
electronically storing the configuration data for a production run, wherein the configuration data for the production run specifies parameters used in the production of products, the specified parameters including at least one parameter selected from one or more of: a range of product identifiers having a starting value and an ending value, a machine for production, a production line, a factory, a product to be produced, and a volume of product to be produced;
transmitting the configuration data to an authorization module;
at the authorization module:
   determining whether the production run according to the specified parameters in the configuration data is authorized;
   generating validated configuration data comprising a key, a representation of a plurality of authorized product identifiers, and a security token;
transmitting the validated configuration data to a signature module;
at the signature module, signing the validated configuration data;
at an identification module, receiving a request for a product identifier and generating a product identifier in response to the request;
transmitting the product identifier from the identification module to a signature module;
digitally signing the product identifier at the signature module; and
transmitting the digitally signed product identifier to a printer module for physically applying on at least one of the products in the production, the products in the production having been produced according to the signed validated configuration data.

7. The method of claim 6, further comprising:
electronically receiving configuration data from the electronic data store;
electronically storing the configuration data for the production run, wherein the configuration data for the production run specifies parameters used in the production of products;
transmitting the configuration data to the authorization module;
at an authorization module:
   determining whether the production run is authorized;
   generating validated configuration data comprising the key, a representation of a plurality of authorized product identifiers, and the security token;
transmitting the validated configuration data to a signature module;
at the signature module, signing the validated configuration data.

8. The method of claim 6, wherein the request is for a range of identifiers.

9. The method of claim 6, further comprising:
determining if the configuration data for the production run is authorized;
if the production run is authorized:
   generating a security token and associating the token with the configuration data; and
   digitally signing the configuration data by generating a digital signature and associating the digital signature with the configuration data.

10. A method for authenticating a production of products, comprising:
electronically storing configuration data for a production run, wherein the configuration data for the production run specifies parameters used in the production of products, the specified parameters including at least one parameter selected from one or more of: a range of product identifiers having a starting value and an ending value, a machine for production, a production line, a factory, a product to be produced, and a volume of product to be produced;
determining if the configuration data for the production run according to the specified parameters in the configuration data is authorized;
if the production run is authorized:
   generating a security token and associating the token with the configuration data; and digitally signing the configuration data by generating a digital signature and associating the digital signature with the configuration data;

receiving the digitally signed configuration data and the digital signature at a production machine;

at the production machine, verifying the digital signature associated with the digitally signed configuration data;

calculating a set of secure product identifiers based on the digitally signed configuration data;

producing products in a production run according to the digitally signed configuration data; and printing the set of secure product identifiers on the products according to the digitally signed configuration data, the products in the production having been produced according to the digitally signed configuration data.

11. The method of claim 10, wherein the configuration data represents a range of products to be produced.

12. The method of claim 10, wherein the configuration data represents a range of products, machines, factories, ranges, or product volumes that are authorized.

13. The method of claim 10, further comprising receiving a verification request, the request comprising a product identifier.

14. The method of claim 10, further comprising determining if the configuration data for the production run is authorized by reference to a license manager.

15. The method of claim 10, further comprising:
generating the security token for a range of products; and
associating the security token with the range of products.

* * * * *